United States Patent [19]

Adde et al.

[11] Patent Number: 5,622,476
[45] Date of Patent: Apr. 22, 1997

[54] AXIAL FIXING ARRANGEMENT FOR ROTOR BLADES OF A TURBOMACHINE

[75] Inventors: Danielle C. R. Adde, Cesson; Jean-Louis Charbonnel, Boissise le Roi; Philippe F. P. Gougeon, Fontainebleau; Gérard G. Miraucourt, Brie Comte Robert, all of France

[73] Assignee: Societe Nationale d'Etude et de Construction de Moteurs d'Aviation "SNECMA", Paris, France

[21] Appl. No.: 572,045

[22] Filed: Dec. 14, 1995

[30] Foreign Application Priority Data

Dec. 14, 1994 [FR] France .................................. 94 15044

[51] Int. Cl.⁶ .................................................. F01D 5/32
[52] U.S. Cl. ........................................ 416/221; 416/220 R
[58] Field of Search .............................. 416/218, 220 R, 416/221

[56] References Cited

U.S. PATENT DOCUMENTS

| | | |
|---|---|---|
| 2,928,651 | 3/1960 | Turnbull . |
| 3,508,844 | 4/1970 | Le Blanc .................. 416/221 |
| 4,478,554 | 10/1984 | Surdi ..................... 416/220 R |
| 5,259,728 | 11/1993 | Szpunar et al. ........... 416/221 |
| 5,350,279 | 9/1994 | Prentice et al. . |

FOREIGN PATENT DOCUMENTS

| | | |
|---|---|---|
| 0083289 | 7/1983 | European Pat. Off. . |
| 2345605 | 10/1977 | France . |
| 1079073 | 4/1960 | Germany ................... 416/221 |
| 2854629 | 6/1979 | Germany ............... 416/220 R |
| 0781771 | 8/1957 | United Kingdom ........... 416/221 |
| 1141280 | 1/1969 | United Kingdom ........... 416/221 |
| 1491480 | 11/1977 | United Kingdom ........... 416/220 |
| 2038959 | 7/1980 | United Kingdom ........... 416/220 R |

*Primary Examiner*—Edward K. Look
*Assistant Examiner*—Mark Sgantzos
*Attorney, Agent, or Firm*—Oblon, Spivak, McClelland, Maier & Neustadt, P.C.

[57] ABSTRACT

A fixing arrangement for axially fixing a blade in position on a rotor disk of a turbomachine rotor includes a relatively flexible locking wedge inserted between the root of the blade and the bottom of the axial groove in the periphery of the rotor disk in which the root is received in a radially interlocking manner, the locking wedge having a retaining hook which is received in a groove in the blade root to hold the locking wedge in position. In one embodiment the locking wedge holds a plate in position in the recesses defined by undercut projections on the upstream face of the blade root and the rotor disk to prevent axial movement the blade relative to the disk. In an alternative embodiment the downstream end of the locking wedge has a stop which engages the downstream faces of the blade root and the rotor disk to prevent axial movement of the blade in the upstream direction, and the upstream face of the blade root has a projection which overlaps and bears against an upstream face of the disk to prevent axial movement of the blade in the downstream direction.

4 Claims, 3 Drawing Sheets

AXIAL FIXING ARRANGEMENT FOR ROTOR BLADES OF A TURBOMACHINE

BACKGROUND OF THE INVENTION

1. Field of the Invention

The present invention relates to axial flow turbomachines, such as the turbojet engines used to power civil or military aircraft, and more particularly relates to the fixing of rotor blades axially in position on the disk of a turbomachine rotor.

The application of the invention to turbojet engines is only one example of its use, and in no way limits the range of possible uses of the fixing arrangement in accordance of the invention.

2. Summary of the Prior Art

In the construction of gas turbine engines, such as turbojet engines, the fixing of rotor blades is often effected by insertion of the root of the blade into a socket in the periphery of the rotor disk, and the axial positioning of the blades is achieved by means of a 360° spring washer which is located in the grooves formed by undercut projections machined in the upstream face of the disk and on an upstream face of the roots of the blades.

However, during operation of the turbomachine, the blades exert a substantial force in a downstream direction and, as a result, clamp the spring washer against the upstream face of the disk. At the same time, the washer expands in thickness and diameter as a result of the changes in temperature and centrifugal force. This phenomenon is accentuated when the blades are mounted in sockets which are inclined relative to the engine axis. The combined action of these various phenomena produces unacceptable stresses on the periphery of the disk and on the spring washer, and shortens the life of these elements.

It is an object of the invention, therefore, to avoid these drawbacks by proposing an alternative solution for the axial fixing of the blades.

SUMMARY OF THE INVENTION

To this end, according to a first aspect of the invention there is provided a fixing arrangement for axially fixing a blade in position on a rotor disk of a turbomachine rotor, said blade having a root received in a radially interlocking manner in an axial groove in the periphery of said rotor disk, said fixing arrangement comprising a first undercut projection on the upstream face of said blade root, a pair of second undercut projections on the upstream face of said rotor disk on opposite sides of said first undercut projection, a plate engaged behind said first and second undercut projections and against said upstream faces of said blade root and said rotor disk to thereby prevent axial movement of said blade, and a locking wedge inserted between said blade root and the bottom of said axial groove such that the upstream end of said locking wedge is disposed adjacent said plate to hold said plate in position, said locking wedge having a retaining hook and said blade root having a groove in which said retaining hook is received to retain said locking wedge in position, and said locking wedge being flexible to permit insertion or withdrawal of the locking wedge when fitting or removing said blade.

In this case, the locking wedge preferably has a longitudinal recess to allow the passage of a rod for disengaging the retaining hook from the groove in the blade root when the locking wedge is to be withdrawn to allow removal of the blade.

Preferably the plate has two lugs which project therefrom on opposite sides of the upstream end of said locking wedge whereby said locking wedge also serves to prevent rotation of said plate about the axis of said rotor disk.

According to a second aspect of the invention, there is also provided a fixing arrangement for axially fixing a blade in position on a rotor disk of a turbomachine rotor, said blade having a root received in a radially interlocking manner in an axial groove in the periphery of said rotor disk, said fixing arrangement comprising a projection on the upstream face of said blade root which overlaps and bears against an upstream face of said rotor disk to prevent axial movement of said blade in a downstream direction, and a locking wedge inserted axially between said blade root and the bottom of said axial groove from the downstream side of said rotor disk, said locking wedge having a stop at its downstream end which engages the downstream face of said blade root and a downstream face of said rotor disk to prevent axial movement of said blade in an upstream direction, said locking wedge having a retaining hook and said blade root having a groove in which said retaining hook is received to retain said locking wedge in position, and said locking wedge being flexible to permit insertion or withdrawal of the locking wedge when fitting or removing said blade.

Further features of the invention will become apparent from the following description of two preferred embodiments of the invention, given by way of example only, with reference to the attached drawings.

DESCRIPTION OF THE PREFERRED EMBODIMENTS

Figure 1:
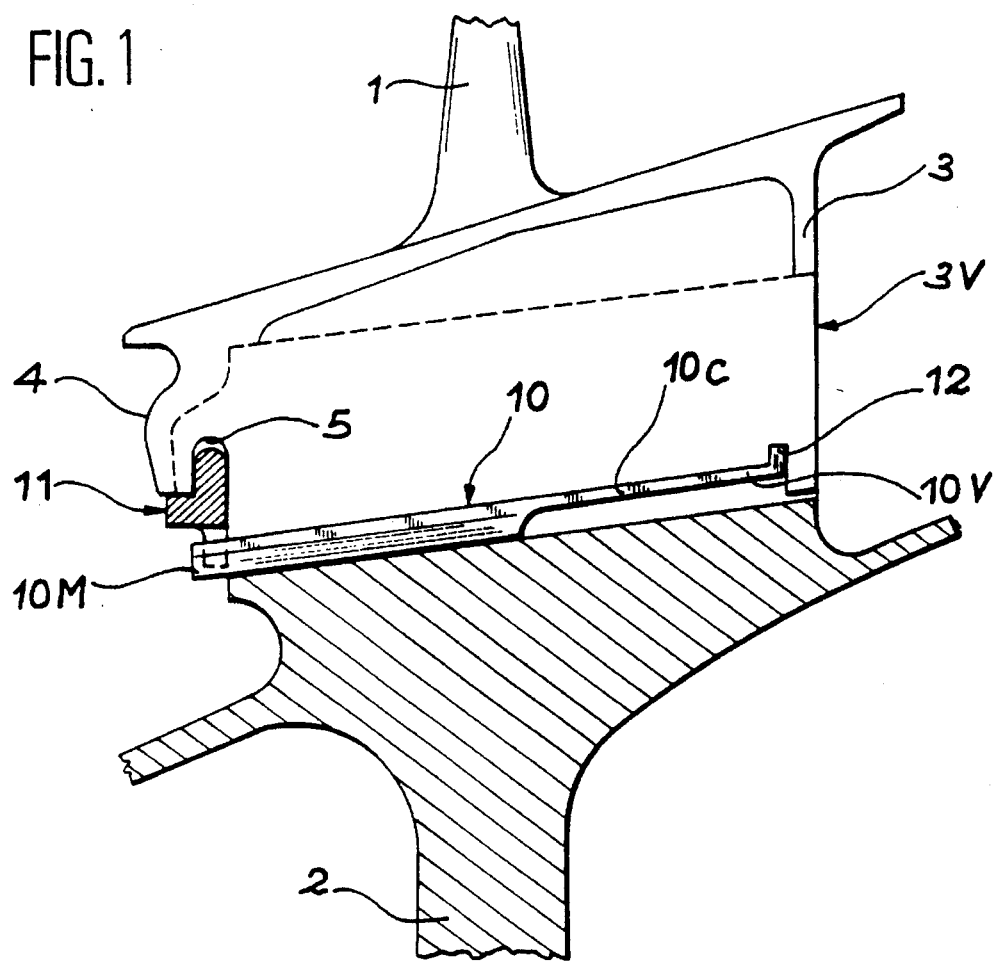
FIG. 1 is an axial sectional view through part of a rotor showing the axial fitting of a blade on a rotor disk in accordance with a first embodiment of the invention.
Figure 2:
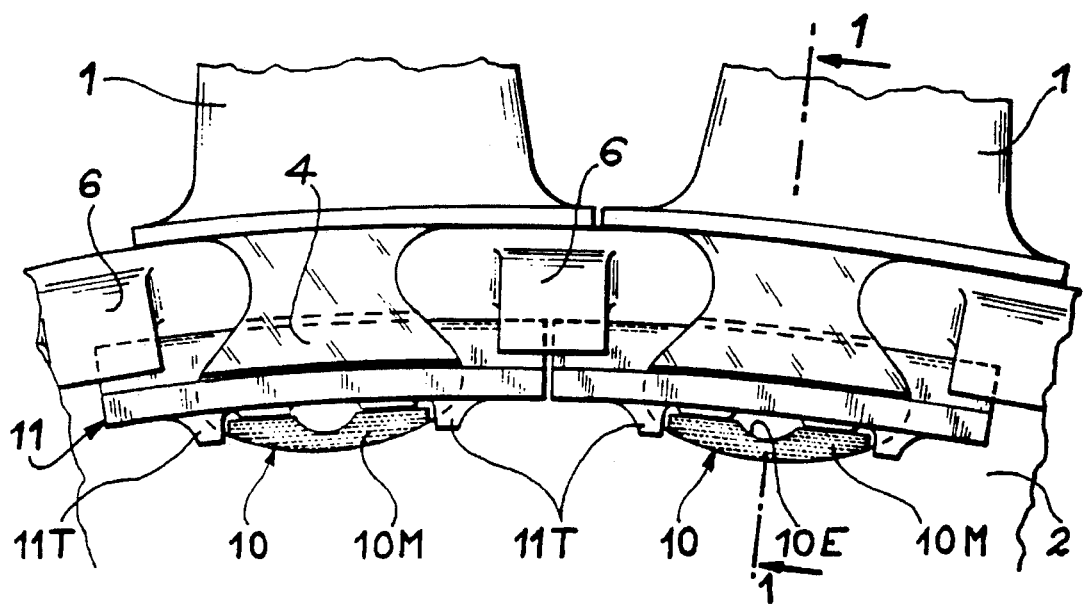
FIG. 2 is a front view of the arrangement shown in FIG. 1.

FIGS. 1 and 2 show the lower end of a blade 1 and its root 3 which is received in dovetail fashion in an axially extending groove or socket in the periphery of a rotor disk 2 to secure the blade 1 radially to the disk 2. These Figures also show the means by which the blade is fixed axially in position on the disk 2. In this first embodiment, these means chiefly comprise an undercut projection 4 on the upstream face of the blade root 3, a pair of undercut projections 6 on the upstream face of the disk 2 on opposite sides of the socket in which the blade root 3 is received, a small plate 11, and a locking wedge 10.

As shown, the small plate 11 is located in the recess 5 defined by the undercut projection 4 on the blade root 3, and on each side thereof the plate 11 is also received in similar recesses defined by the undercut projections 6 on the disk 2. As will be understood, if there is very little axial clearance between the small plate 11 and the undercut projections 4 and 6 and the upstream faces of the blade root and the disk, the blade root 3 will be fixed axially relative to the disk 2.

The small plate 11 is held in position in the recesses defined by the undercut projections 4 and 6 by means of the locking wedge 10 which is inserted into the axial groove in the disk 2 by sliding it under the root 3 of the blade 1. The locking wedge 10 has its downstream end 10V provided with a hook 12 which is designed to fit into a corresponding groove in the root 3 of the blade in order to hold the locking wedge axially in position relative to the blade root 3, and in this position the upstream end 10M of the locking wedge protrudes beyond the upstream face of the root 3 and under the plate 11 (i.e. radially inwardly thereof) so as to prevent the plate 11 from slipping out of the recess 5. The axial locking of the blade 1 is thus secured.

In FIG. 2 it will be noted that the upstream end 10M of the locking wedge 10 is relatively wide, and fits into the space between two lugs lit projecting radially inwardly from the small plate 11 towards the axis of the disk 2. Thus, the small plate 11 is prevented from moving in a circumferential direction around the longitudinal axis of the disk, and the assembly of small plates belonging to all of the blades cannot revolve around this axis.

Reverting to FIG. 1, it will be observed that at least a central part 10C of the locking wedge 10 is relatively thin, the purpose of this being to give the locking wedge 10 a degree of longitudinal flexibility in order to allow the insertion and withdrawal of the wedge between the blade root 3 and the bottom the groove in the disk 2. This flexibility permits bending of the downstream end 10V of the wedge 10 so that it can be introduced, in spite of the hook 12, into the space existing between the underside of the root 3 and the disk 2. The wedge 10 can thus be inserted into position, with the hook 12 entering the corresponding groove in the root 3, thanks to the resilience of the downstream end 10V, when the wedge reaches the correct position.

Figure 3:
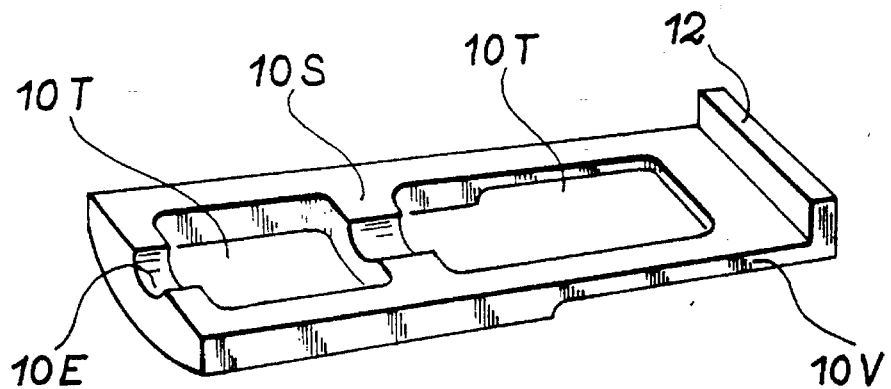
FIG. 3 is a perspective view of the locking wedge used in the first embodiment of FIGS. 1 and 2.

Similarly, withdrawal of locking wedge 10 may be effected by flexing the downstream end 10V of the wedge 10 so as to disengage the hook 12 from the positioning groove in the blade root 3. As FIG. 3 shows, the upstream end 10M of the locking wedge has a longitudinally extending recess 10E, having an arcuate section, in its upper surface facing the root 3. This recess 10E allows a rigid rod to be inserted longitudinally along the wedge in order to bring about the flexing of the downstream end 10V to release the hook 12 from the groove in the root 3. The wedge 10 can then be withdrawn. Following this, the small plate 11 can be disengaged from the undercut projections 4 and 6, and the blade 1 can be removed from the disk 2.

FIG. 3 shows the shape of the locking wedge 10 more clearly, particularly the hook 12 situated at the downstream end 10V and the recess 10E situated centrally in the upper surface 10S. Central holes 10T are provided to reduce weight and also to aid the resilience of the downstream end 10V.

Figure 6:
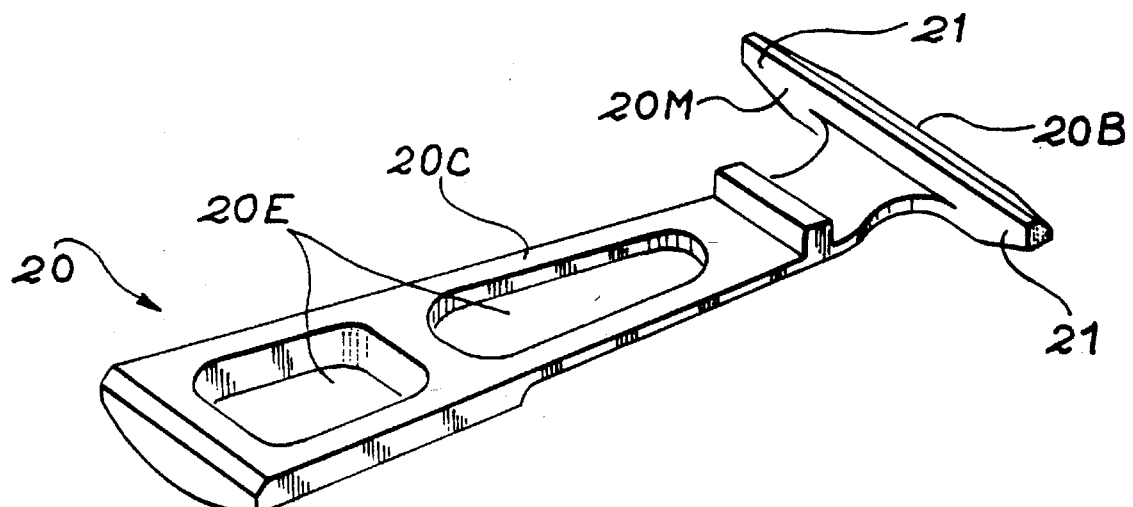
FIG. 6 is a perspective view of the locking wedge used in the second embodiment of FIGS. 4 and 5.
Figure 4:
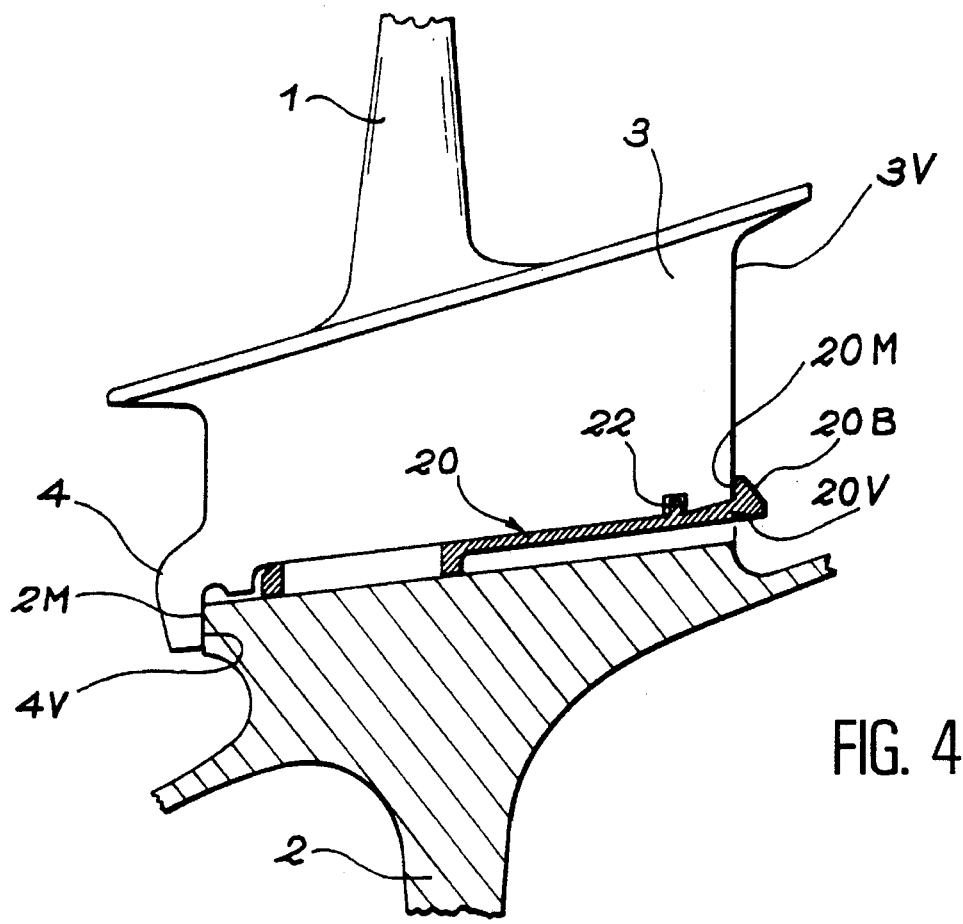
FIG. 4 is a view similar to FIG. 1 but showing a second embodiment of the invention.
Figure 5:
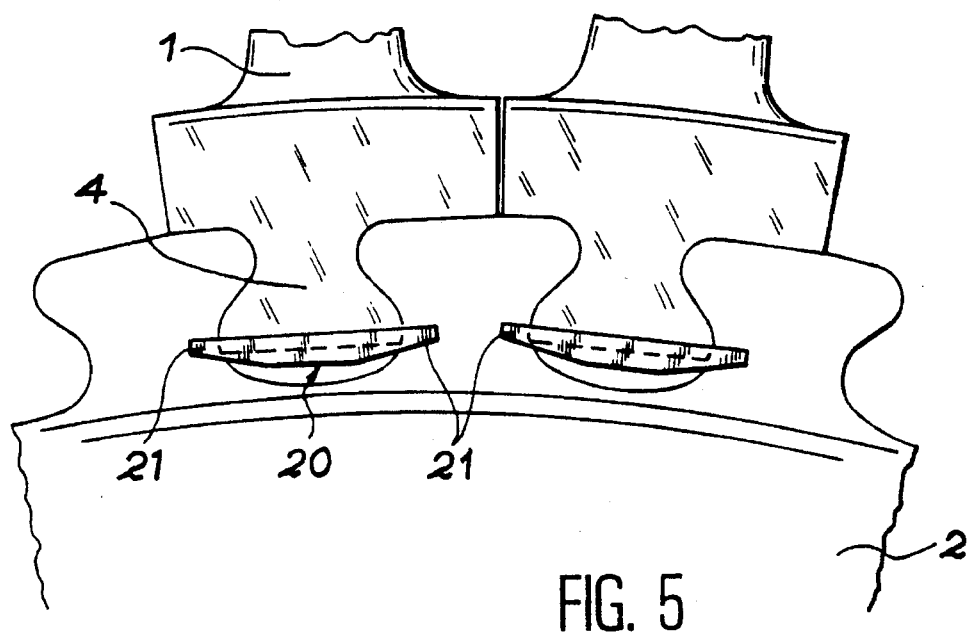
FIG. 5 is a rear view of the arrangement shown in FIG. 4.

In the second embodiment shown in FIGS. 4 to 6, the blade root 3 which is secured radially in an axial groove in the periphery of the rotor disk 2 again has a projection 4 situated on its upstream face. In this case, however, the projection 4 extends radially inwardly towards the axis of the disk 2, so that its downstream surface 4V overlaps an upstream surface 2M of the disk 2 which forms a stop to limit axial movement of the root 3, and hence the blade 1, in the downstream direction.

A locking wedge 20 inserted into the axial groove in the disk 2 under the root of the blade 1 from the downstream side is used to fix the axial position of the blade 1 in the upstream direction, but without the aid of the small plate 11 used in the first embodiment.

As may be observed, at its downstream end 20V, the locking wedge 20 has a stop 20B with an upstream surface 20M which faces the downstream surface 3V of the blade root 3. The locking wedge 20 also has a hook 22 which projects upwards, as does the hook 12 in the first embodiment, and which is designed to engage in a groove in the root 3 to fix the wedge axially in position relative to the blade root 3.

FIG. 4 shows the assembly in its locked position, that is to say with the hook 22 situated in the groove of the root 3 and the upstream surface 20M of the stop 20B against the downstream surface 3V of the root 3. As shown in FIG. 6, extensions 21 the stop 20B and its upstream surface 20M extend on both sides the wedge 20 so that, in addition to the stop surface 20M bearing against the blade root surface 3V, it also bears against the downstream surface of the disk 2 in the region of the extensions 21 as shown in FIG. 5.

It will thus be appreciated that the locking wedge 20 and the upstream projection 4 of the blade root 3 together serve to fix the blade axially in position relative to the disk 2.

As can been seen in FIG. 6, a central part 20C of the locking wedge 20 may be of reduced thickness and have recesses 20E to provide sufficient flexibility for the wedge 20 to be bent to facilitate installation and withdrawal. Thus, when the blade root 3 is fitted on the disk 2, the upstream end of the locking wedge 20 may be inserted between the bottom of the root 3 and the disk, and the flexibility of the wedge enables the hook 22 also to be inserted until it enters the groove in the root 3. The wedge 20 is then locked in position and the blade 1 is locked on the disk 2.

To remove the blade 2 it will be sufficient to bend down the downstream end 20V of the locking wedge until the hook 22 is disengaged from the groove in the root 3. The wedge 20 is then withdrawn and the blade 1 is freed.

The fixing arrangement in accordance with the invention permits the fixing and removal of individual blades independently of one another. It also prevents local stress phenomena encountered at the periphery of the disk as in previous arrangements using a spring washer as described earlier.

Obviously, numerous modifications and variations of the present invention are possible in light of the above teachings. It is therefore to be understood that, within the scope of the appended claims, the invention may be practiced otherwise than as specifically described herein.

We claim:

1. A fixing arrangement axially fixing a blade in position on a rotor disk of a turbomachine rotor, said blade having a root received in a radially interlocking manner in an axial groove in a periphery of said rotor disk, said fixing arrangement comprising:

a first undercut projection on an upstream face of said blade root, a pair of second undercut projections on an upstream face of said rotor disk on opposite sides of said first undercut projection, a plate engaged behind said first and second undercut projections and against said upstream faces of said blade root and said rotor disk, said plate preventing axial movement of said blade, and a flexible locking wedge inserted between said blade root and a bottom of said axial groove such that an upstream end of said locking wedge is disposed adjacent said plate to hold said plate in position, said flexible locking wedge having a retaining hook and said blade root having a groove in which said retaining hook is received to retain said locking wedge in position, and said flexible locking wedge permitting one of insertion and withdrawal of the locking wedge when one of fitting and removing of said blade is respectively accomplished.

2. A fixing arrangement according to claim 1, wherein said locking wedge is provided with a longitudinal recess assisting in disengaging said retaining hook from said groove in said blade root when said locking wedge is to be withdrawn to allow removal of said blade.

3. A fixing arrangement according to claim 1, wherein said plate has two lugs which project therefrom on opposite sides of the upstream end of said locking wedge such that said locking wedge prevents rotation of said plate about the axis of said rotor disk.

4. A fixing arrangement according to claim 1, wherein said retaining hook is located at a downstream portion of the flexible locking wedge.

* * * * *